US011562537B2

(12) United States Patent
Kulkarni et al.

(10) Patent No.: US 11,562,537 B2
(45) Date of Patent: Jan. 24, 2023

(54) SYSTEM FOR RAPID DIGITIZATION OF AN ARTICLE

(71) Applicant: Nachiket Kulkarni, Maharashtra (IN)

(72) Inventors: Nachiket Kulkarni, Maharashtra (IN); Purva Kulkarni, Maharashtra (IN)

(73) Assignees: Manoj Wad, Pune (IN); Nachiket Kulkarni, Pune (IN)

( * ) Notice: Subject to any disclaimer, the term of this patent is extended or adjusted under 35 U.S.C. 154(b) by 0 days.

(21) Appl. No.: 17/293,490

(22) PCT Filed: Nov. 13, 2019

(86) PCT No.: PCT/IN2019/050838
§ 371 (c)(1),
(2) Date: May 13, 2021

(87) PCT Pub. No.: WO2020/100162
PCT Pub. Date: May 22, 2020

(65) Prior Publication Data
US 2022/0005269 A1    Jan. 6, 2022

(30) Foreign Application Priority Data
Nov. 14, 2018  (IN) .............................. 201821042719

(51) Int. Cl.
G06T 15/30    (2011.01)
G06T 17/20    (2006.01)
G06T 7/73     (2017.01)
G06T 7/13     (2017.01)
G06T 7/90     (2017.01)
(Continued)

(52) U.S. Cl.
CPC ............ *G06T 17/20* (2013.01); *G05B 19/042* (2013.01); *G06T 5/006* (2013.01); *G06T 7/13* (2017.01); *G06T 7/593* (2017.01); *G06T 7/73* (2017.01); *G06T 7/90* (2017.01); *H04N 13/243* (2018.05); *H04N 13/254* (2018.05); *H04N 13/296* (2018.05); *G05B 2219/25252* (2013.01);
(Continued)

(58) Field of Classification Search
None
See application file for complete search history.

(56) References Cited

U.S. PATENT DOCUMENTS 9,410,879 B1 *   8/2016  Hose ..................... G01N 21/255
10,789,569 B1 *  9/2020  Anor ..................... G07G 1/0036
(Continued)

OTHER PUBLICATIONS

Chen et al., Garment Modeling with a Depth Camera, 2015, AMC Trans. Graph., 34(6) (Year: 2015).*

*Primary Examiner* — Anh-Tuan V Nguyen
(74) *Attorney, Agent, or Firm* — DP IP Group; Franco De Liguori

(57) ABSTRACT

Disclosed is a system for rapid digitization of an article that provides a 3d image of an object, such as a clothing article, wherein the object can be virtually viewed from all sides to be viewed by the user. The system for rapid digitization is configured with two microprocessors for rapidly digitizing the clothing apparel into its equivalent 3d model. The system for rapid digitization is provided with a communication device that displays the status of the system and occurring defects are notified through the same. The system for rapid digitization provides a 3d .obj (object) file of the apparel thereby making it portable in nature.

15 Claims, 3 Drawing Sheets

(51) Int. Cl.
  *G06T 7/593* (2017.01)
  *H04N 13/254* (2018.01)
  *H04N 13/296* (2018.01)
  *H04N 13/243* (2018.01)
  *G05B 19/042* (2006.01)
  *G06T 5/00* (2006.01)
(52) U.S. Cl.
  CPC ............... *G06T 2200/08* (2013.01); *G06T 2207/10012* (2013.01); *G06T 2210/16* (2013.01)

(56) References Cited

U.S. PATENT DOCUMENTS

| | | | | |
|---|---|---|---|---|
| 2010/0305909 | A1* | 12/2010 | Wolper | G06T 17/00 703/1 |
| 2015/0287242 | A1* | 10/2015 | Kim | G06T 15/04 345/420 |
| 2018/0205941 | A1* | 7/2018 | Kopf | H04N 13/282 |
| 2020/0097892 | A1* | 3/2020 | Cheng | G06K 7/1417 |

* cited by examiner

SYSTEM FOR RAPID DIGITIZATION OF AN ARTICLE

FIELD OF INVENTION

The present invention generally relates to Image Processing systems and more particularly to automatic digital object creation.

BACKGROUND OF INVENTION

In the era of advancing technology, a customer has to interpret how apparel would look like on his/her body, without having to stand in the long queues of changing rooms. An upcoming technology called as Virtual Mirror makes use of augmented Reality (AR) to help overcome this. It helps the customers accurately see any clothing article at-scale whereby enabling them to purchase with more certainty and satisfaction. The virtual mirror uses the 3D model of the clothing article and projects it into the real world. The object detection is another key mechanism that is presently utilized to detect a specific object from an image. The object detection technique uses learning algorithm to identify objects. The use of computer algorithms to perform alterations on an image to obtain the desired image is termed as Image processing. The Image processing is widely known technique for detecting an object from an image.

However in order to convert a clothing article into a 3D model, the software artisans have to sit for at least 2 to 3 hours to build an identical 3D model. At present there is no software/system that can rapidly and automatically convert the clothing article into its equivalent digital form of 3D model. Currently the use of proximity sensors in combination with object detection techniques is not renowned.

Accordingly, there is a need of a system that can speed up the process of converting a packed article or object into its digitized 3d format. Moreover there is a need for system that can intensify accuracy of automatic digitization technique using image processing techniques and computer graphics techniques. Additionally, there is a need for system that improvises accuracy of the automatic digitization technique for the object, such as a clothing article.

SUMMARY OF THE INVENTION

The present invention provides a system for rapid digitization of an article or an object, such as a clothing article. The system includes a rapid digitization station. The rapid digitization station comprises a transparent conveyor belt, a dc motor, at least two pairs of dual cameras, a master microprocessor, a secondary microprocessor, a scanning region, an opposed pair of sensor modules, a plurality of proximity sensors, a waiting region, a platform, and a visual communication device. The master microprocessor is configured to facilitate processing and controlling of individual components of the system thereby communicating with the secondary microprocessor. The opposed pair of sensor modules communicate with respective plurality of proximity sensors for sensing position of the subject, such as a clothing article.

The system for rapid digitization of clothing comprises a sensor data acquisition module, a sensor data analysis module, a motor control module, a single camera capture module, an object position analysis and correction module, an illumination controller module, a synchronized camera capture module, a graphical data preprocessing module, a surface mesh module, a display and touch screen input module and an operator verification module. The sensor data acquisition module is configured to trigger the sensor data analysis module. The sensor data analysis module is configured to trigger the single camera capture module upon generating a positive signal from the master microprocessor. The motor control module is configured to regulate movement and rotation of the dc motor thereby providing movement of conveyor belt upon receiving control signals from the sensor data analysis module. The single camera capture module forwards the captured image to the object position analysis and correction module. The object position analysis and correction module is configured to analyze coverage of the captured image thereby detecting the boundary color from the captured image. The illumination control module is configured to illuminate the LEDs with contrasting colors during scanning of the subject on the scanning region. Upon confirmation from the object position analysis and correction module that the object, namely the clothing article in this one embodiment, is in position and correctly lit from the illumination controller module, the synchronized camera capture module captures 2 sets of 2 images from the cameras mounted above and below the scanning surface. The graphical data pre-processing module is configured to receive 2 set of 2 images from the synchronized camera capture module, thereby computing two depth maps/matrices for every point of the received images. The graphical data pre-processing module will process the captured images thereby creating two sets of depth maps and surface meshes, namely a front surface mesh and a back surface mesh. The graphical data pre-processing module is configured to forward the front surface mesh and back surface mesh to the surface mesh module for 3d object creation wherein the surface mesh module interpolates and extrapolates to join the front surface mesh with the back surface mesh to create a hyper-realistic 3d model of the object.

BRIEF DESCRIPTION OF DRAWINGS

The objectives and advantages of the present invention will become apparent from the following description read in accordance with the accompanying drawings wherein.

DETAILED DESCRIPTION OF THE INVENTION

The invention described herein is explained using specific exemplary details for better understanding. However, the invention disclosed can be worked on by a person skilled in the art without the use of these specific details.

References in the specification to "one embodiment" or "an embodiment" means that particular feature, structure, characteristic, or function described in connection with the embodiment is included in at least one embodiment of the invention. The appearances of the phrase "in one embodiment" in various places in the specification are not necessarily all referring to the same embodiment.

References in the specification to "preferred embodiment" means that a particular feature, structure, characteristic, or function described in detail thereby omitting known constructions and functions for clear description of the present invention.

This present invention is illustrated with reference to the accompanying drawings, throughout which reference numbers indicate corresponding parts in the various figures. These reference numbers are shown in bracket in the following description.

Figure 1:
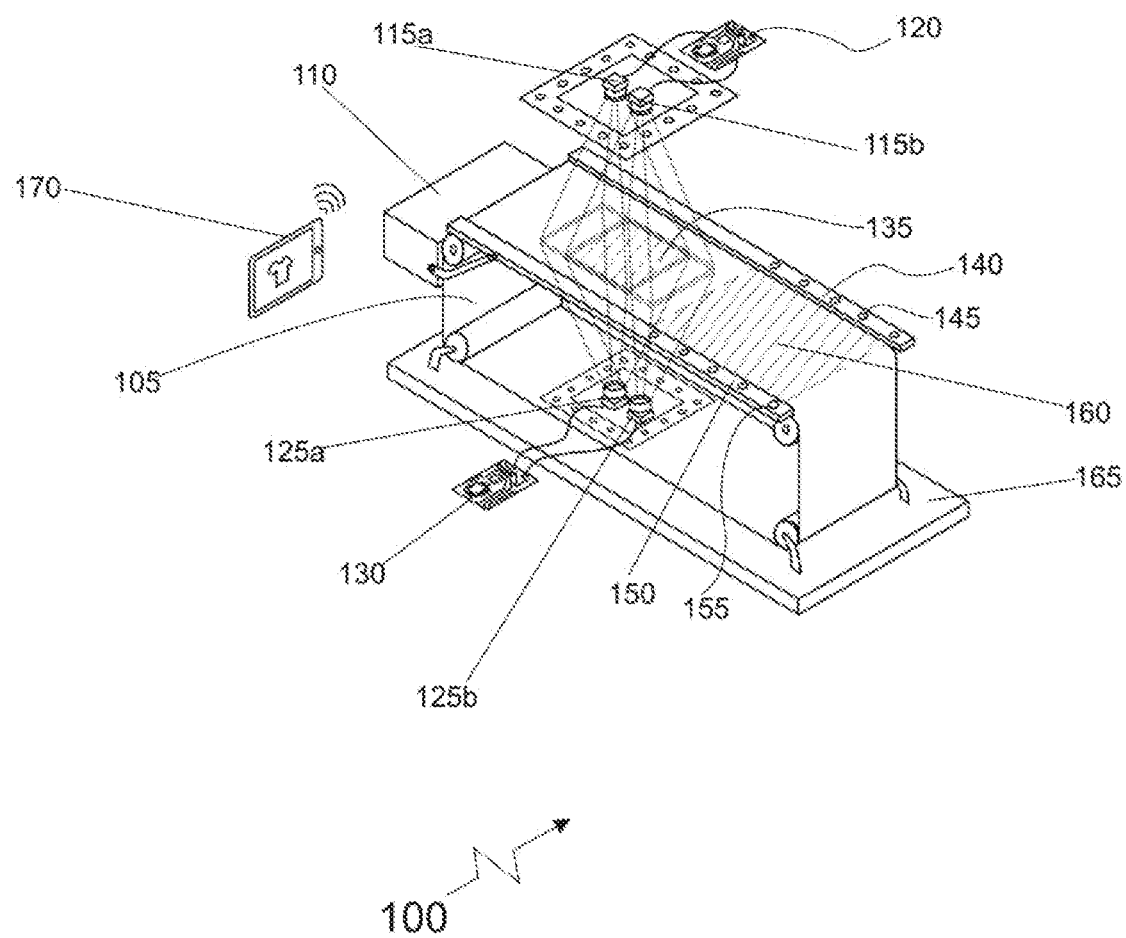
FIG. 1 is a perspective view of a system for rapid digitization of an object in accordance with the present invention.

Referring to FIG. 1, a system for rapid digitization for an article 100 in accordance with the present invention is shown. The system for rapid digitization for an article 100 (the system 100, hereinafter) is adapted to rapidly convert an object into its digitized 3d format. In this one preferred embodiment, the object is a clothing article however it is understood here that the object may vary in other alternative embodiments as per intended application of the system 100. The system 100 includes a rapid digitization station that comprises a transparent conveyor belt 105, a dc motor 110, at least two pairs of dual cameras 115*a*, 115*b* and 125*a*, 125*b*, a master microprocessor 120, a secondary microprocessor 130, a scanning region 135, an opposed pair of sensor module 140 and 150, a plurality of proximity sensors 145 and 155, a waiting region 160, a platform 165, and a visual communication device 170.

In this preferred embodiment, the transparent conveyor belt 105 is configured to carry a subject along the length of system 100. In the context of the present invention, the subject is a clothing article. However, it is understood that the subject may vary in other alternative embodiments of the present invention. The transparent conveyor belt 105 is driven by a dc motor 110. The conveyor belt rotates in either in a clockwise or in an anticlockwise direction along the length of system 100. The dc motor 110 controls movement of transparent conveyor belt 105. The pair of dual cameras 115*a* and 115*b* is connected with one another to acquire synchronized images of the clothing article. Further, the dual cameras 115*a* and 115*b* are positioned at a first predetermined location with respect to the scanning region 135 to perceive a top vision of the clothing article placed upon the scanning region 135. Preferably, the dual cameras 115*a* and 115*b* are positioned perpendicular to the scanning region 135. Additionally, the dual cameras 115*a* and 115*b* are connected with a master microprocessor 120 for communicating and processing data captured by the dual cameras 115*a*, 115*b*. The pair of dual cameras 125*a* and 125*b* is positioned at a second predetermined location with respect to the scanning region 135. Preferably, the dual cameras 125*a*, 125*b* are parallel positioned below the scanning region 135 to obtain a stereoscopic bottom vision of clothing articles placed on scanning region 135. In the context of the present invention, the scanning region 135 is a region where clothes are scanned through two pair of dual cameras 115*a*, 115*b* and 125*a*, 125*b*. In addition, the pair of dual cameras 125*a* and 125*b* is connected with one another to acquire synchronized images of the clothing article. Further, the pair of dual cameras 125*a* and 125*b* are connected with the secondary microprocessor 130 for processing data captured by the cameras 125*a* and 125*b*. The master microprocessor 120 and secondary microprocessor 130 communicate with each other via Wi-Fi signals. The sensor modules 140 and 150 are positioned in a parallel opposite position with respect to the transparent conveyor belt 105. The opposed pair of sensor modules 140 and 150 embraces a plurality of proximity sensors 145 and 155. The plurality of proximity sensors 145 and 155 sense the location of placed clothing articles and update the master microprocessor 120 with the current position thereof. The waiting region 160 holds the clothing articles that are queued for being scanned. The system 100 rests on platform 165. However, the system 100 is capable to withstand on any ground surface. The visual communication device 170 communicates with system 100 using Wi-Fi signals.

Figure 2:
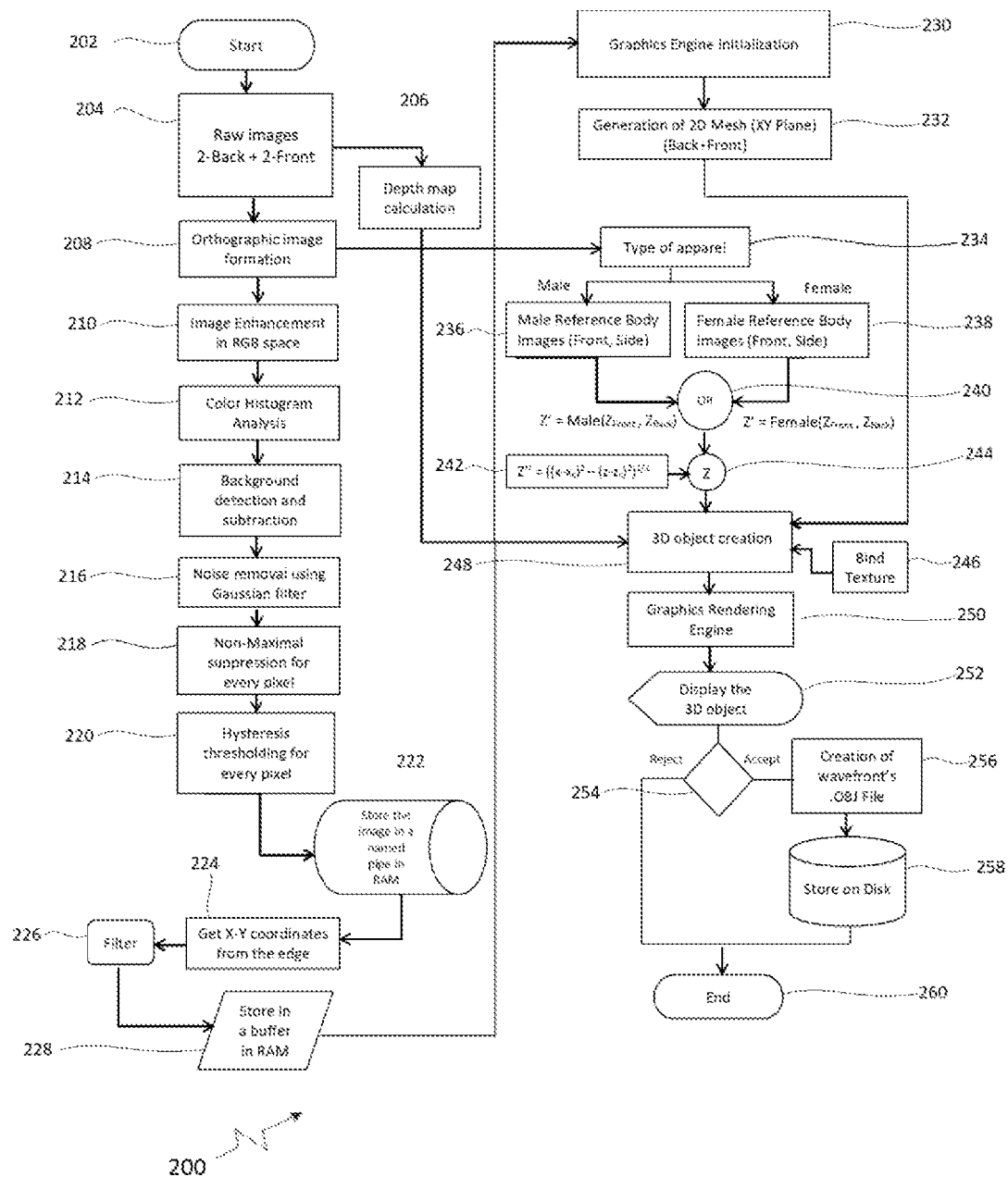
FIG. 2 is a flow chart illustrating conversion of a plurality of raw images into a 3 dimensional object by using the system for rapid digitization of FIG. 1.

Referring to FIG. 2, the system 100 illustrates a systematic flow chart of 3d object creation from multitier images. In this preferred embodiment, the system 100 is initialized and the images taken by two pairs of dual cameras are in raw format. In an initial step 202, two pairs of dual cameras 115*a*, 115*b* and 125*a*, 125*b* capture the images and forward the same to next step 204. In this step 204, the captured images are checked and stored in the program memory in their raw form and forwarded to step 206 and 208 respectively. In step 206, said four captured raw images are used to calculate two depth maps, one for the front view of the clothing article and one for the back view of the clothing article respectively. In step 208, the system 100 calculates the perspective error between the two images, obtained from cameras 115*a* and 115*b*, positioned off-axis but perpendicular to scanning surface plane. Additionally, the perspective error is then used to formulate an orthographic image of the front view of the clothing article. The system then calculates the perspective error between the two images obtained from 125*a* and 125*b* respectively. The perspective error is then used to formulate an orthographic image of the rear view. Additionally, the microprocessor 120 forwards depth values towards step 248. In step 210, the images are enhanced with RGB (Red, Green, and Blue) filters to match the color accuracy with the true tones of the clothing article and their instances are forwarded to step 212. In further step 212, the color histogram analysis of enhanced images are acquired to identify background color from said image and forwarded towards next step 214. In step 214, the detected background color from said image is subtracted and it is forwarded to next step 216. In next step 216, the noise is detected and removed from the images using a Gaussian filter. Additionally, the gradient magnitude of the smoothened image is determined and the outcome is forwarded to step 218. In step 218, a non-maximal suppression is carried out on the image by scanning it completely and removing the unwanted pixels which may not constitute the edge. The result obtained from step 218 is a binary image containing the edges that is further forwarded towards step 220. In step 220, a hysteresis thresholding is carried out for every pixel where all the edges absent in between the predefined minimum and maximum threshold values are dropped. The final edge detected image is forwarded to step 222. In step 222, the outcome is stored inside a named pipe in RAM (Random Access Memory) and forwarded to step 224. In the next step 224, the XY coordinates of the pixels lying on the edge are obtained and forwarded to step 226. In step 226, the XY co-ordinates are filtered to remove any redundant co-ordinates and further forwarded to step 228. In step 228, the set of filtered points is stored inside a buffer memory that is further forwarded to step 230.

In next step 230, the graphics engine is initialized with suitable frame buffers and APIs and control is transferred towards step 232. In step 232, the 2d objects are created from a set of points identified from the images and joined with each other in a predefined frame structure. Additionally, the control is transferred from step 232 towards 248 for further processing. In one embodiment, the predefined frame structure is a rectangular mesh structure or a triangular mesh structure. However, it is understood that the other types of frame structures may be utilized in other alternative embodiments of the present invention. In next step 234, the orthographic image obtained in step 208 is received for identifying the type of the clothing article either male or female apparel. Further, the identification of clothing apparels is achieved by employing certain machine learning algorithms. Furthermore, the control is transferred to either step 236 or 238 depending upon the identification of apparel. In steps 236 and 238, the reference images constituting the silhouette front view and side view of an ideal male or female body type are scanned and the obtained result is forwarded to step 240. In the step 240, the obtained result from steps 236 and 238 is analyzed and modified as per requirement. Further, the modified and analyzed z coordinates and forwarded to step 244. In step 242, a secondary value of the z coordinate is calculated and forwarded to step 244. In step 244, the final value of the z coordinate is chosen from the z values obtained from steps 240 and 242 and the same is forwarded to step 248. In step 246, the pixels from 3d objects are mapped into equivalent texels and forwarded towards step 248. In step 248, the 3d object is formed by adding the z coordinate obtained from step 244 to every point in the 2d mesh which is obtained from the step 232. Moreover, the 3d object is given a protruded and realistic effect by adding the obtained depth values from step 206. Further, the 3d object is mapped with texels and is forwarded to step 250. In the next step 250, the 3d object obtained from step 248 is rendered and forwarded towards step 252. In the subsequent step 252, 3d object is displayed on the display device for the user to inspect and the control is transferred to step 254. In step 254, the user is provided with an option to either reject or accept the 3d object. The control is transferred towards step 256 where the object is accepted by the user. Contrarily, the control is transferred towards step 260 where the object is rejected by the user. In step 256, the X, Y and Z coordinates of a 3d object are stored in the wavefront's .obj format, thereby creating an object file that is forwarded to step 258. In step 258, the object file is stored in the hard drive or any preferred storage medium. In final step 260, the system 100 completes the process of converting a 2d surface mesh to 3d object.

Figure 3:
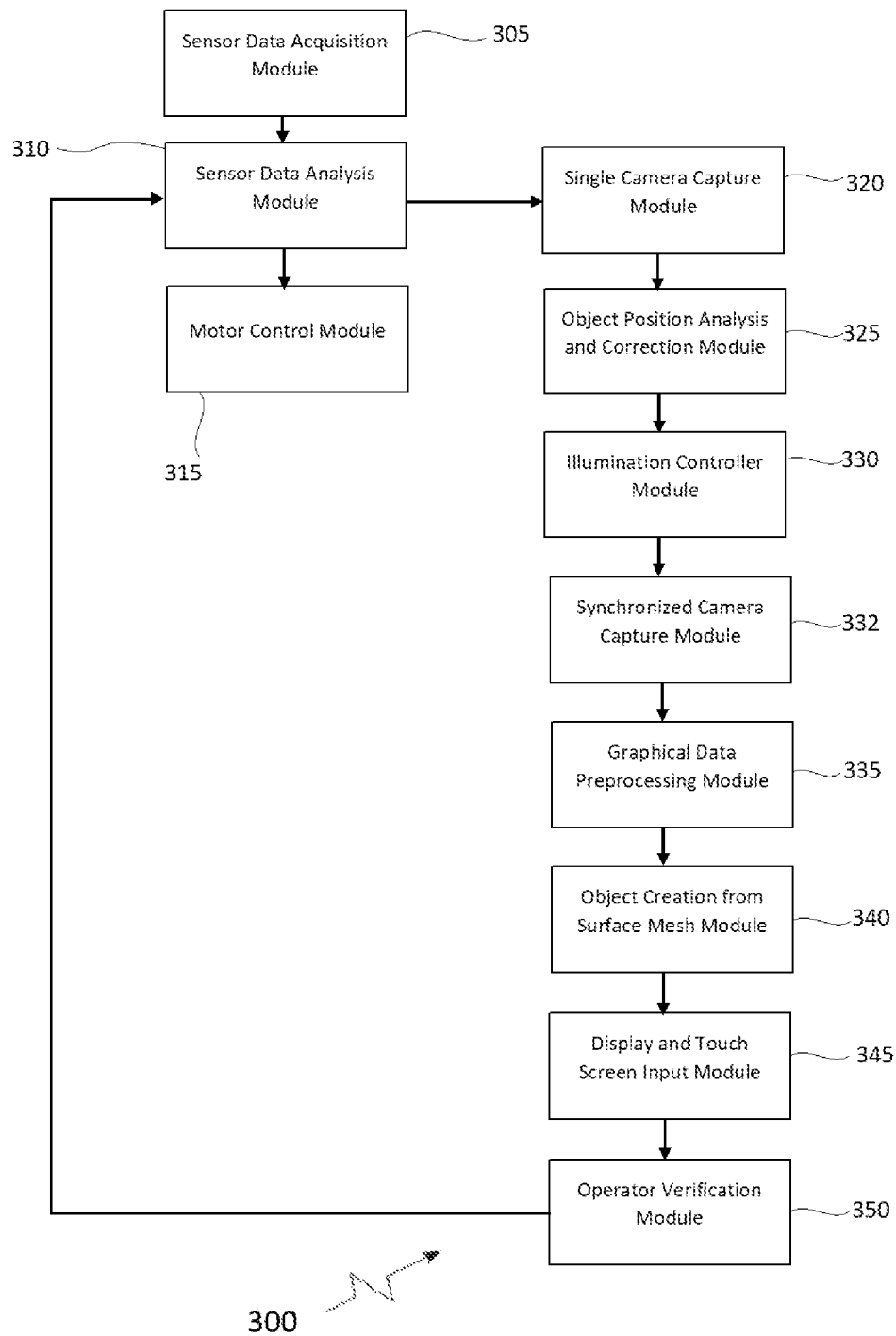
FIG. 3 is a functional block diagram of the system for rapid digitization of the object by using the system for rapid digitization of FIG. 1.

Referring to FIG. 3, the system 100 includes a sensor data acquisition module 305, a sensor data analysis module 310, a motor control module 315, a single camera capture module 320, an object position analysis and correction module 325, an illumination controller module 330, an synchronized camera capture module 332, a graphical data preprocessing module 335, a 3d object creation from surface mesh module 340, a display and touch screen input module 345 and an operator verification module 350.

The sensor data acquisition module 305 includes a plurality of proximity sensors 145 and 155. Further, these proximity sensors 145, 155 are configured to detect the presence of the clothing article within 150 cm range. Additionally, these proximity sensors 145, 155 are connected to the master microprocessor 120 through a signal conditioning circuit that is configured to cancel the incoming noise generated by the proximity sensors 145, 155. Further, the master microprocessor 120 converts the analog data obtained from proximity sensors 145 and 155 into digital data that is compatible for the further processing.

The sensor data analysis module 310 regulates the capturing of the images through plurality of dual cameras 115a, 115b, 125a and 125b. The positive signal generated from sensor data analysis module 310 triggers the single camera capture module 320. Similarly, the negative signal generated from sensor data analysis module 310 triggers motor control module 315. The sensor data analysis module 310 is configured to be triggered when sensor data acquisition module has valid data ready. Further, the input data acquired to this module 310 is in a binary form that is whether the clothing article is present or absent. Additionally, said data is utilized to find the duration for which the dc motor 110 should be turned on that further moves the clothing article in the image capturing zone 135.

The motor control module 315 is configured to be monitored by sensor data analysis module 310. The sensor data analysis module 310 consists of a simple dc motor 110 that operates at a predefined RPM. Additionally, the microprocessor 120 is configured to control the instruction to motor driving circuit via GPIO (General Purpose Input Output) pins. Further, the proximity sensors 145, 155 create a closed loop feedback mechanism to submit precise location of the clothing article placed on the conveyor surface 105.

The single camera capture module 320 is configured to be triggered by receiving positive signal from sensor data analysis module 310. In this preferred embodiment, the single camera capture module 320 elaborates information about cameras utilized and significance of their placement in the system 100. An image is captured from camera 115a and is then sent to object position analysis and correction module 325.

The object position analysis and correction module 325 is configured to receive the front image of clothing articles from single camera capture module 320. Further, the object position analysis and correction module 325 is configured to perform the object coverage verification, wherein said module 325 checks whether the entire clothing article is present in the captured image. If the clothing article is found to not have been covered completely in the image, appropriate control signals are sent to the motor control module to get the clothing article in the scanning area 135 precisely. Additionally, the object position analysis and correction module 325 checks whether the orientation angle of captured clothing article is in defined position. Similarly, if any orientation angle defects are present, corrective linear and/or non-linear geometric transforms are applied. The object position analysis and correction module 325 is configured to check for any wrinkles and folds pertaining with the clothing article. Further, if wrinkles/folds are found, an error message is displayed on input display device 170 for the operator to readjust the clothing article. Upon corrective action by the operator, single camera capture module 320 will be activated. The object position analysis and correction module 325 also performs the boundary color identification of the clothing article for the illumination controller module 330.

The illumination controller module 330 includes a plurality of varied colored LEDs, with an attached controller. In the context of the present invention, the predominant boundary color of the clothing article is identified from the boundary color analysis by object position analysis and correction module 325. Further, the Object position Analysis and correction module 325 sends the RGB values represented in 8 bits each. Additionally, a hue angle is calculated based on the values obtained by the formula Hue $= \operatorname{atan} 2(\alpha, \beta)$ and $C=\sqrt{(\alpha^2+\beta^2)}$, where $\alpha=\frac{1}{2}(2R-G-B)$ and $\beta=\sqrt{3}/2(G-B)$. The contrast RGB values are calculated by inverting the calculated Hue angle. A single or combination of several LEDs is switched on depending on the calculated RGB values which are in complete contrast with the prominent boundary color. The synchronized camera capture module 332 is activated to capture the four images.

The synchronized camera capture 332 module having plurality of stereo cameras 115a, 115b, 125a and 125b are configured with set of two 8 MP CMOS camera sensors that are installed on top and bottom of the scanning region 135 such that, the axis of camera is aligned perpendicular to surface of said scanning region 135.

Further, the vertical distance between the camera plane and the scanning region 135 is denoted by "h". In a preferred embodiment of the present invention, the value of "h" is in a range from 40 cm to 137 cm. It is understood that value of "h" lower than 40 cm will increase the lens distortion and corrective measures increases in time complexity resulting in slower digitization. Further, it is understood that the value of "h" higher than 137 cm reduces the depth resolution impairing the depth accuracy of the stereo image.

Further, the distance between the two camera sensors 115a, 115b and 125a, 125b is referred as "w". In a preferred embodiment of the present invention, the value of "w" is in a range from 6 cm to 10 cm assuming 98° FOV (Field of Vision). It is understood that, the value of "w" lesser than 6 cm reduces the depth resolution of the stereo image. The value of "w" higher than 10 cm reduces the area of overlap between the two camera sensors 115a, 115b and 125a, 125b that reduces the effective scanning surface.

The Focal length of the camera can vary depending on the FOV of the camera sensors for instance, a camera sensor with physical size equivalent to mobile camera sensors, has focal length in a range from 3.05 mm to 1.85 mm. However, a camera sensor with bigger physical size enhances the effective focal length in pixels thereby increasing the depth resolution and accuracy of said system 100. A FOV of a maximum 126° is preferred in the context of the present invention. It is understood that any FOV higher than aforementioned FOV causes more distortions in the resultant image thereby increasing the computational time required to apply corrective nonlinear geometric transformations. Additionally, an increase in FOV requires the value of "h" to be decreased to cover the scanning area and avoid redundant space. Further, this reduced "h" value may cause operational inaccessibility to the clothing articles for the operator. Additionally, the FOV lesser than 62.2° requires "h" to be increased thereby reducing the depth resolution and scanning accuracy.

In the context of the present invention, the clothing article surface depth is modeled with up to 2.1 mm of accuracy which is enough to cover the area of embroidery, collar or area of buttons. The two stereo image capturing cameras 115a, 115b and 125a, 125b capture a total four images of which, one pair of camera 115a, 115b capture front view of said clothing article while, other pair of camera 125a, 125b capture back view of the said clothing article. Further, said captured images obtained from said cameras 115a, 115b and 125a, 125b are used to create a depth map for the top and the bottom of the clothing article. This data is then sent to the graphical data pre-processing module 335.

Graphical data pre-processing module 335 receives said four input images captured by two pairs of dual cameras 115a, 115b and 125a, 125b from synchronized camera capture module 332. Further, two depth maps or two depth matrices for every point are computed from four input images captured by said two pairs of dual cameras 115a, 115b and 125a, 125b, by the below described computational steps.

$X_1$ and $Y_1$ are the world coordinates of the Point(X, Y, Z) as observed from the left camera.

$X_1 = xl*(f-z)/f$
$Y_1 = yl*(f-z)/f$

This gives an equation of the epiline (L1) passing through the points (xl, yl, 0) and (X, Y, Z). The corresponding world coordinates of the image point (xl, yl) lies anywhere on the epiline.

X2 and Y2 are the world coordinates of the Point(X, Y, Z) as observed from the right camera.

$X_2 = xr*(f-z)/f$
$Y_2 = yr*(f-z)/f$

This gives an equation of the epiline (L2) passing through the points (xr, yr, 0) and (X, Y, Z). The corresponding worlds coordinate of the image point (xr, yr) lies anywhere on the epiline. Here, since the two cameras are mounted on the same height Y1 and Y2 are same. The two cameras are positioned at a distance d apart, Hence, X2=X1+d.

The intersection point (X, Y, Z) can be computed from the two lines (L1 and L2) given by the equations 1 and 2. Thus the Z component of the point or its depth can be easily calculated with the help of the two stereo cameras.

Formula: $Z = fxd/D$, where D is disparity i.e. $D = x_r - x_l$

The time complexity of finding point x2 in right image corresponding to x1 in left image, is N, where N is the number of horizontal pixels of the image.

Glass Slab Measurements=160 cm×120 cm
Resolution=3280×2464

The Depth resolution of clothing article scanning system is calculate as follows Formula: $dZ = Z^2 dp/fxb$ where
dZ is the depth accuracy,
Z is the maximum depth to be measured
dP is the minimum disparity error
fp is the focal length of the camera in pixels
b is the baseline or the distance between the two cameras
The focal length in pixels is calculate as follows $$fp = R_W \frac{fmm}{sw} :$$ Formula

| Focal length in Pixels (fp) | Focal length in mm ($F_{mm}$) | Image width ($R_w$) | Sensor width ($S_w$) |
|---|---|---|---|
| 2709 | 3.05 mm | 3280p | 3.68 mm |

Rw=Horizontal resolution
Sw=Sensor width
Fmm=Focal length in mm

| Z | $F_{pixels}$ | B | FOV (Horizontal) | $D_Z$ |
|---|---|---|---|---|
| 700 mm | 2709 | 70 mm | 98° | 2.5 mm |

The Depth map/matrix is calculated for every pixel with a time complexity of $N^2$, where N is the horizontal resolution of the image. The depth map is normalized with respect to a predefined threshold depth value to differentiate the apparel's surface and the protruding beads/design pattern present on said.

In this preferred embodiment, the two images captured by two pairs of camera 115a, 115b and 125a, 125b are used to formulate two orthographic images, each for back and front of the clothing article. The orthographic images are then opened in RGB space. Further, color histogram analysis is carried upon said any two orthographic images to identify the background color in the image. Moreover, said background color is then subtracted and the images are converted to grayscale. Additionally, a Gaussian filter is applied on the image to remove speckle noise if any. Further, the gradient magnitude of the image is then computed on the smoothened image using Sobel' s gradient operator. Moreover, the best pixels for the edges are picked by employing non-maximum suppression and the final edge detection of the clothing article is carried out by the hysteresis method. Further, the edge detected images are stored in a named pipe in the RAM. Similarly, both the edge detected images are raster scanned with an appropriate interval of pixels and the parallel points whose XY coordinates are lying on the detected edge in each horizontal retrace are stored in a buffer in the program memory. The said set of points is further filtered to remove the redundant points. Further, the underlying graphics engine and the frame buffers are initialized with the suitable APIs. The target processor used by default is CPU however; the rendering process can be fastened by involving a GPU (Graphical Processing Unit) support. The received points having the said XY coordinates are joined together to form two 2D objects/two surface meshes, each for back and front images. Moreover, a suitable triangular/rectangular surface mesh is created within the boundaries of the 2D objects by using the defined primitives of the underlying graphics APIs (Application Program Interfaces). The back and front surface meshes formed are processed separately. The graphical data pre-processing module 335 forwards the said surface meshes towards 3d object creation from surface mesh module 340.

The 3d object creation from surface mesh module 340 receives the surface mesh and the depth map/matrix from graphical data pre-processing module 335. The type of apparel (male apparel/female apparel) is identified by employing certain machine learning algorithms. Depending upon the type, a set of predefined silhouette reference images constituting the front view and side view of male or female bodies are loaded. The reference images are raster scanned horizontally and the parallel XY coordinates of the pixels, lying on the contour of the silhouette bodies, are stored in dedicated buffers in the program memory. The interval of the retrace is kept exactly same as used in the scanning of clothing article.

The side view reference image gives the maximum Z coordinate a mesh line of the 2D object of the apparel at a specific Y coordinate must have. Three points are obtained for every horizontal retrace while scanning the side view reference image. The middle point determines the datum point which is used to distinguish the maximum Z value for the front mesh and the maximum Z value for the rear mesh for every point in the apparel having the same Y coordinate.

The front view reference image is used to determine the set of stitching points. A set of materials are defined beforehand with their individual stretching capacities. If the width of the apparel for a particular Y coordinate is greater than the width of the reference body as viewed from front, for the same Y coordinate, then the endpoints of the apparel for that particular horizontal retrace are stitched (i.e the z coordinate of those endpoint/s is made 0 or endpoint/s of back and front meshes are merged). Similarly, for the apparel's sleeves, if present, the apparel's edge detected image and the reference body's image for front view are scanned vertically for a specified range. The specified range encompasses the area containing the forearms of the reference image. The distance between the apparel's endpoints is compared with the distance between the reference body's endpoints for a particular X coordinate for the particular vertical retrace. If the distance of the apparel is found to be greater than that of the body, the endpoints of the apparels are stitched. Different types of sleeves call for different types of stitching methodologies. For the sleeve pattern like "Off-Shoulder Sleeves", the stitching points are extrapolated.

The Z coordinate of the apparel for a point in a mesh line is increased/decreased gradually using the equation $Z''=(((Xe-Xs)/2)^2-(X-Xc)^2)^{1/2}+Zc$. Here, Xc and Zc are the coordinates of the center of the curve given by the equation. Xe and Xs are the X coordinates of the endpoints of the apparel at a particular Y coordinate. And, X is the X coordinate of the points on the particular mesh line which is obtained from the 2d surface mesh. The Z'' obtained from the equation is compared with the Z reference coordinate Z' for the corresponding mesh line. If Z'' is greater than Z', then the Z value for the point in the mesh line is equated to Z' and Z'' otherwise. The reference Z value is modified depending on the dress type as well. If the width of the mesh line of the apparel at a particular horizontal retrace is found greater than the corresponding reference body width, as viewed from front, exceeding the threshold difference, then the Z reference coordinate is taken as the average of maximum Z reference obtained till then with respect to Back/Front mesh and the Z reference corresponding to the Y coordinate of the mesh line under consideration. This technique helps in encompassing the intricacies of apparel's actual look on a human body thereby maintaining the smoothness of the 3D object. The procedure mentioned above is used for both the back and front 2D parts. Once this is done, the back and front parts are joined together to form a single 3D model. The realism of the 3D object is enhanced by adding the lighting parameters. Phong interpolation method is used, whereby linearly interpolating the normal vertex vectors, across the surface of the model.

The pixel coordinates and their corresponding depth values are obtained from the depth map calculated in Graphical data pre-processing module. The polygon in the mesh containing the pixel coordinate is identified. Every point P forming the polygon under consideration is translated to a new point P1, by a distance d equal to the depth value of the pixel in the direction of the normal vector (Vn) associated with the said vertex.

$$P(X, Y, Z) = P(X, Y, Z) + \frac{d}{\sqrt{vnX^2 + vnY^2 + vnZ^2}}(vnX, vnY, vnZ)$$

The method above is repeated for every pixel coordinate in the depth map. By this method, the area containing embroidery, collar, frills, buttons etc. which is usually raised from the fabric's surface, appear commensurately protruded, giving the 3d model a realistic appearance.

The orthographic images created, are used as the texture images. The image pixels are then converted to texels and are mapped onto the 3d object. The lighting environment is initialized with ambient and diffused lights.

The said 3D object is then ready to be displayed. The 3d object then is ready to be examined from all the sides by the rotation feature provided by the proposed system 100. Additionally, the X, Y, Z coordinates are stored in a file in the wavefront's .obj format. The wavefront's format is chosen as it can encode not only the surface geometry but can also store the color and texture information. Similarly, said wavefront's .obj format has a good import and export support from almost all CAD software. The system 100 is also configured to store the points in several other formats like DAE and FBX. The operator examines and verify 3D model for any flaws and errors.

The display and touch screen input module 345 contains a display monitor 170 that displays the error messages for the operator. The display monitor 170 contains the user interface including the touch gestures to rotate and view the 3D model. The, display monitor 170 provides accept and reject buttons for accepting/rejecting the 3D models.

The operator verification module 350 enables the operator to perceive the object from all angles. The 3D clothing article can be rotated about the y axis. Following equations are used to implement the rotate functionality. The X and Z coordinates of position and view vectors of the camera are changed as follows.

position_x=position_x+(view_x−position_x)*speed
position_z=position_z+(view_z−position_z)*speed
view_z=position_z+sin(speed)*(view_x−position_x)+cos(speed)*(view_z−position_z)
view_x=position_x+cos(speed)*(view_x−position_x)−sin (speed)*(view_z−position_z)

Here, speed=(mid_x−mousePos.x))/1000, where the mousePos.x is the cursor X-coordinate. The above vectors viz. position_x, position_z, view_x, view_z are the position and view vectors of the camera respectively which are used to modify the model view and projection matrices.

Now referring to FIGS. 1, 2 and 3, an operational flow of system 100 is described hereinafter. In operation, upon initializing the system 100, the sensor data acquisition module 305 utilizes plurality of proximity sensors 145 and 155 to detect the presence of clothing articles placed upon the waiting region 160. Further, the sensor data acquisition module 305 triggers a positive signal and notifies to sensor data analysis module 310 about the location data of clothing article. The sensor data analysis module 310 calculates the exact position of the clothing article based on data received from the sensor data acquisition module 305. Accordingly, the sensor data analysis module 310 facilitates controlled movement of motor control module 315 based on the data provided by the sensor data acquisition module 305. Thereafter, the clothing articles are moved from the waiting region 160 towards the scanning region 135 through controlled movement facilitated by the motor control module 315 such that the control is transferred from the sensor data analysis module 310 to the single camera capture module 320. The single camera capture module 320 communicates with 115a which captures the front image of the clothing article. Additionally, the captured image is analyzed by the object position analysis and correction module 325. The object position analysis and correction module 325 verifies for wrinkles or folds occurred on the clothing article and accordingly sends an error message towards the display and touch screen input module 345. Accordingly, the display and touch screen input module 345 informs the operator to take corrective measures based on the displayed error message. Further, the object position analysis and correction module 325 checks whether entire clothing article is captured inside said image. Accordingly, the object position analysis and correction module 325 sends control signals to motor control module 315 to properly adjust the movement of the conveyor belt 105 if the clothing article is not covered inside an image. The conveyor belt 105 adjusts the position based on received data to fit the clothing article inside the captured image. Further, the object position analysis and correction module 325 analyzes the boundary color of clothing article and forwards it towards illumination controller module 330 after verifying the correctness of position. The illumination controller module 330 calculates a contrast color to the received prominent background color wherein the calculated contrast color illuminates with several LEDs installed in background of the scanning region 135. The said LEDs illuminate the calculated contrast color to highlight the clothing articles placed on scanning region 135. The synchronized camera capture module 332 captures the front and the rear images of the highlighted clothing article and forwards the said towards the graphical data preprocessing module 335. The graphical data preprocessing module 335 removes background color from the captured image and send a control signal to the controller module 330 to switch off the illuminated LEDs. The graphical data preprocessing module 335 calculates depth maps, applies required filters and performs edge detection on the orthographic images, obtained from the four captured images, thereby constructing two 2d surface meshes for back and front of the clothing article and forwards the surface mesh towards object creation from surface mesh module 340. The object created from surface mesh module 340 converts pixels into texels and performs the required operations to convert a surface mesh to 3d object. Further, the converted 3d object is forwarded towards display and touch screen input module 345 wherein the 3d object is disclosed to the operator on a visual communication device 170. The operator verification module 350 allows the flexible rotation of the 3d object displayed on communication device 170 thereby completing the operation when operator is satisfied with displayed 3d image.

The foregoing description of specific embodiments of the present invention has been presented for purposes of illustration and description. They are not intended to be exhaustive or to limit the present invention to the precise forms disclosed, and obviously many modifications and variations are possible in light of the above teaching.

The embodiments were chosen and described in order to best explain the principles of the present invention and its practical application, to thereby enable others, skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the scope of the present invention.

The invention claimed is:

1. A system for rapid digitization of an object, such as an article of clothing, the system comprising:
   a rapid digitization station having a transparent conveyor belt, a dc motor, at least two pairs of dual cameras a master microprocessor, a secondary microprocessor, a scanning region, an opposed pair of sensor modules, a plurality of proximity sensors, a waiting region, a platform, and a communication device;
   a sensor data acquisition module;
   a sensor data analysis module;
   a motor control module;
   a single camera capturing module;
   an object position analysis and correction module;
   an illumination controller module;
   a synchronized camera capture module;
   a graphical data preprocessing module;
   a surface mesh module;
   a display and touch screen input module; and
   an operator verification module, wherein
the master microprocessor is configured to facilitate processing and controlling of individual components of the system thereby communicating with the secondary microprocessor, the opposed pair of sensor modules are configured to communicate with the respective plurality of proximity sensors for sensing position of the object, the sensor data acquisition module triggers the sensor data analysis module for generating a positive signal, the sensor data analysis module triggers the single camera capture module to capture images, the sensor data analysis module generates a negative signal for triggering the motor control module, the motor control module is configured to regulate movement and rotation of the dc motor thereby providing movement of the conveyor belt upon receiving control signals from the sensor data analysis module, the single camera capture module elaborates information about cameras utilized and significance of their placement thereby forwarding the captured images to the object position analysis and correction module, the object position analysis and correction module is configured to analyze coverage of the captured images thereby detecting a boundary color from the captured images, the illumination controller module is configured to illuminate light emitting diodes (LEDs) with contrasting colors during scanning of the object on the scanning region, the synchronized camera capture module is configured to capture at least two sets of at least two images by the at least two pairs of dual cameras, the graphical data pre-processing module is configured to receive images captured by the synchronized camera capture module thereby computing two depth maps/matrices for every point of the received images, the graphical data pre-processing module processes and forwards the captured images thereby creating two sets of depth maps and surface meshes to form a front surface mesh and a back surface mesh of the object, and the surface mesh module is configured to join the front surface mesh to the back surface mesh for creating a hyper realistic 3d model of the object.

2. The system as claimed in claim 1, wherein the at least two pairs of dual cameras are positioned at a predefined location on the scanning region for perceiving a stereoscopic image of the object.

3. The system as claimed in claim 1, wherein the transparent conveyor belt is configured for carrying the object along a length thereof.

4. The system as claimed in claim 1, wherein the dc motor is configured for driving the transparent conveyor belt.

5. The system as claimed in claim 1, wherein the waiting region facilitates the transparent conveyor belt to hold the object in a queue for a predetermined time period.

6. The system as claimed in claim 1, wherein the communication device displays a status of the system.

7. The system as claimed in claim 1, wherein the sensor data acquisition module is configured to detect the presence of the object within 150 cm range.

8. The system as claimed in claim 1, wherein the object position analysis and correction module applies corrective linear/nonlinear geometric transformations upon the captured image for improvising defects relating to an orientation angle of the image.

9. The system as claimed in claim 1, wherein the illumination controller module illuminates a single or a combination of several LEDs depending on calculated RGB values which are in complete contrast with the prominent boundary color of the object.

10. The system as claimed in claim 1, wherein the illumination controller module facilitates contrast RGB values that are calculated by inverting a calculated Hue angle.

11. The system as claimed in claim 1, wherein the graphical data preprocessing module is configured such that pixels for edges are picked by employing non-maximum suppression and a final edge detection of the object is carried out by a hysteresis method.

12. The system as claimed in claim 1, wherein the surface mesh module interpolates and extrapolates to join the front surface mesh with the back surface mesh while creating the hyper-realistic 3d model of the object.

13. The system as claimed in claim 1, wherein the surface mesh module stores the 3d model in an .obj format thereby achieving portability of a generated output file.

14. The system as claimed in claim 1, wherein the display and touch screen input module has a display monitor working on the communication device that displays the 3d model.

15. The system as claimed in claim 1, wherein the operator verification module enables an operator to perceive the object from all angles thereby facilitating rotation of the 3d model.

* * * * *